US012664883B2

(12) United States Patent
Ucar et al.

(10) Patent No.: US 12,664,883 B2
(45) Date of Patent: Jun. 23, 2026

(54) INCORPORATING THE ACTIONS OF AN EGO DRIVER WHEN AFFECTED BY UNSAFE DRIVING

(71) Applicant: TOYOTA MOTOR ENGINEERING & MANUFACTURING NORTH AMERICA, INC., Plano, TX (US)

(72) Inventors: Seyhan Ucar, Mountain View, CA (US); Sachin Sharma, Kalamazoo, MI (US); Yongkang Liu, Mountain View, CA (US); Emrah Akin Sisbot, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/531,520

(22) Filed: Dec. 6, 2023

(65) Prior Publication Data

US 2025/0191463 A1 Jun. 12, 2025

(51) Int. Cl.
*G08G 1/00* (2006.01)
*G08G 1/01* (2006.01)
*G08G 1/0967* (2006.01)

(52) U.S. Cl.
CPC ......... *G08G 1/0129* (2013.01); *G08G 1/0112* (2013.01); *G08G 1/0967* (2013.01)

(58) Field of Classification Search
CPC .. G08G 1/0129; G08G 1/0112; G08G 1/0967; G08G 1/00
(Continued)

(56) References Cited

U.S. PATENT DOCUMENTS 10,037,699 B1 7/2018 Toyoda
10,540,892 B1 1/2020 Fields
(Continued)

FOREIGN PATENT DOCUMENTS

DE 102018203376 A1 9/2019

OTHER PUBLICATIONS

Singh, "Critical Reasons for Crashes Investigated in the National Motor Vehicle Crash Causation Survey," Traffic Safety Facts Crash-Stats, Report No. DOT HS 812 506, Mar. 2018, National Highway Traffic Safety Administration (https://crashstats.nhtsa.dot.gov/Api/Public/Publication/812506).
(Continued)

*Primary Examiner* — Shardul D Patel
(74) *Attorney, Agent, or Firm* — SHEPPARD, MULLIN, RICHTER & HAMPTON LLP; Daniel N. Yannuzzi

(57) ABSTRACT

Systems and methods are provided for incorporating an ego driver's style and reactions into unsafe driving detection and mitigation. The system can determine a presence of an unsafe driving condition for a vehicle and evaluate the unsafe driving condition to generate one or more characteristics associated with the unsafe driving condition. One or more driver actions associated with the one or more characteristics can be determined based on information from a database of driver actions. The system can determine a conflict between one of the driver actions and guidance associated with the unsafe driving condition and update the guidance based on the determined conflict.

20 Claims, 7 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 11,232,708 | B1 | 1/2022 | Fields | |
| 11,256,937 | B2 | 2/2022 | Ucar | |
| 11,380,198 | B2 | 7/2022 | Ucar | |
| 11,414,088 | B2 | 8/2022 | Ucar | |
| 2017/0038773 | A1* | 2/2017 | Gordon | G08G 1/012 |
| 2022/0068122 | A1 | 3/2022 | Ucar | |
| 2022/0375348 | A1 | 11/2022 | Ucar | |
| 2024/0280985 | A1* | 8/2024 | Aragon | G06N 3/042 |

OTHER PUBLICATIONS

"Distracted Driving in America: A Public Safety Crisis," Selective Insurance Group, Inc., 1 page (https://www.selective.com/~/media/Files/S/Selective-V2/documents/pdf-links/Distracted-Driving-Infographic.pdf).

"Global Status Report on Road Safety 2018," World Health Organization (WHO), Management of Noncommunicable Diseases, Disability, Violence and Injury Prevention (NVI), Jun. 17, 2018, 424 pages https://www.who.int/publications/i/item/9789241565684.

Madrid et al., "Matrix Profile XX: Finding and Visualizing Time Series Motifs of All Lengths using the Matrix Profile," 2019 IEEE International Conference on Big Knowledge (ICBK), Nov. 2019, pp. 175-182 (https://doi.org/10.1109/ICBK.2019.00031).

Mercer et al., "Introducing the Contrast Profile: A Novel Time Series Primitive that Allows Real World Classification," Data Mining and Knowledge Discovery (DMKD 2022), 36:877-915, Mar. 17, 2022 (https://doi.org/10.1007/ $10618-022-00824-5).

Wang et al., "Opportunistic Strategy for Cooperative Maneuvering Using Conflict Analysis," 2021 IEEE Intelligent Vehicles Symposium (IV), Jul. 2021, pp. 348-353 (https://doi.org/10.1109/IV48863.2021.9575586).

* cited by examiner

INCORPORATING THE ACTIONS OF AN EGO DRIVER WHEN AFFECTED BY UNSAFE DRIVING

TECHNICAL FIELD

The present disclosure relates generally to the detection of unsafe driving conditions, and in particular, some implementations may relate to systems implemented in vehicles and remote servers to automatically identify unsafe driving conditions.

DESCRIPTION OF RELATED ART

Unsafe driving conditions comprise any driving behavior that can jeopardize the safety of others, such as aggressive driving, distracted driving, and reckless driving. The early detection of these conditions can be critical to protecting pedestrians, other drivers, or other people in the nearby vicinity. Unsafe driving conditions can be identified at the vehicle level, that is, a vehicle or group of vehicles can monitor other nearby vehicles and run an unsafe driving detection algorithm to detect unsafe driving. Unsafe driving conditions can also be identified at the remote server level, which can observe multiple variables and run anomaly detection methods to detect anomalies. However, drivers may respond to unsafe driving conditions in particular ways when notified by the system. These responses may actually increase the risk to a driver.

BRIEF SUMMARY OF THE DISCLOSURE

According to various embodiments of the disclosed technology, a method can comprise determining a presence of an unsafe driving condition for a vehicle; evaluating the unsafe driving condition to generate one or more characteristics associated with the unsafe driving condition; determining one or more driver actions associated with the one or more characteristics based on information from a database of driver actions; determining a conflict between one of the driver actions and guidance associated with the unsafe driving condition; and updating the guidance based on the determined conflict.

In some embodiments, updating the guidance comprises instructing the vehicle not to notify the driver of the vehicle of the unsafe driving condition.

In some embodiments, the method further comprises instructing one or more neighboring vehicles to mitigate the unsafe driving condition.

In some embodiments, the method further comprises receiving data indicating a new driver action and adding the new driver action to the database of driver actions.

In some embodiments, determining the conflict comprises determining multiple conflicts between the one or more driver actions and the guidance and updating the guidance to account for the multiple conflicts.

In some embodiments, determining the conflict comprises performing pattern recognition of the one or more driver actions and the unsafe driving condition.

In some embodiments, the method further comprises associating the one or more driver actions with the unsafe driving condition in the database of driver actions.

In some embodiments, the method further comprises generating a notification to display to the driver of the vehicle with the updated guidance.

In some embodiments, the method further comprises warning the driver of the vehicle of a nearby unsafe vehicle based on the determined one or more driver actions.

According to various embodiments of the disclosed technology, a vehicle can comprise a plurality of sensors, a processor, and a memory coupled to the processor to store instructions, which when executed by the processor, cause the processor to: determine a presence of an unsafe driving condition for a vehicle; evaluate the unsafe driving condition to generate one or more characteristics associated with the unsafe driving condition; determine one or more driver actions associated with the one or more characteristics based on information from a database of driver actions; determine a conflict between one of the driver actions and guidance associated with the unsafe driving condition; and refrain from notifying the driver of the vehicle about the unsafe driving condition based on the conflict.

In some embodiments, the processor is further configured to instruct one or more neighboring vehicles to mitigate the unsafe driving condition.

In some embodiments, the processor is further configured to receive data indicating a new driver action and add the new driver action to the database of driver actions.

In some embodiments, determining the conflict comprises performing pattern recognition of the one or more driver actions and the unsafe driving condition.

In some embodiments, the processor is further configured to associate the one or more driver actions with the unsafe driving condition in the database of driver actions.

According to various embodiments of the disclosed technology, a non-transitory machine-readable medium can have instructions stored therein, which when executed by a processor, cause the processor to determine a presence of an unsafe driving condition for a vehicle; evaluate the unsafe driving condition to generate one or more characteristics associated with the unsafe driving condition; determine one or more driver actions associated with the one or more characteristics based on information from a database of driver actions; determine a conflict between one of the driver actions and guidance associated with the unsafe driving condition; and instruct one or more neighboring vehicles to mitigate the unsafe driving condition.

In some embodiments, the processor is further configured to update the guidance based on the conflict.

In some embodiments, the processor is further configured to generate a notification to display to the driver of the vehicle with the updated guidance.

In some embodiments, the processor is further configured to receive data indicating a new driver action and adding the new driver action to the database of driver actions.

In some embodiments, determining the conflict comprises determining multiple conflicts between the one or more driver actions and the guidance and updating the guidance to account for the multiple conflicts.

In some embodiments, determining the conflict comprises performing pattern recognition of the one or more driver actions and the unsafe driving condition.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Traditional systems can alert drivers of an upcoming or current unsafe condition. However, drivers have individualized reactions to unsafe drivers. Some examples include: washing the windshield with the windshield wiper when there is an aggressive tailgater to communicate to the aggressive driver that they're too close; moving the vehicle at least two lanes away from a swerving driver and passing the swerving vehicle; and/or leaving additional space between the ego vehicle and a weaving driver so the weaving driver will pass the ego driver. Traditional systems alert drivers of unsafe driving conditions in order to prevent collisions or additional safety hazards. However, these alerts may cause a driver to act a certain way and actually increase the risk of a collision. For example, a subject vehicle may be weaving lanes behind the ego vehicle. Traditionally, the ego vehicle can detect the unsafe subject vehicle and instruct the driver to stay in the lane and do nothing to avoid a rear-end collision. However, the driver of the ego vehicle may rely on his/her instincts and make a lane change that causes a rear-end collision, because the driver prefers to stay multiple lanes away from a weaving driver. The guidance provided by traditional systems is insufficient because there are multiple ways a driver can ignore the provided guidance. By simply alerting the driver to an unsafe driving condition, rather than providing a specific or overly narrow instruction, the vehicle system can trigger the driver's future actions to avoid a collision while still allowing the driver to act a certain way based on his or her preferences given certain unsafe driving conditions.

The systems and methods described herein improve traditional systems by incorporating the driver's preferences and actions in determining what guidance to provide to an ego driver. In the above example, the system could have prevented the driver's actions by simply not alerting the ego vehicle. The system can infer the characteristics of the unsafe driving condition and perform pattern recognition to determine how the driver will respond to the unsafe driving condition. The system can retrieve the possible actions of the ego driver based on characteristics of the unsafe driving (e.g., type of unsafe driving, degree of repetition, movement pattern). Based on the predicted response, the vehicle and/or remote server can form alternative guidance to provide to the driver (e.g., based on predictions regarding how the driver might otherwise respond) or may not provide guidance at all.

Figure 1:
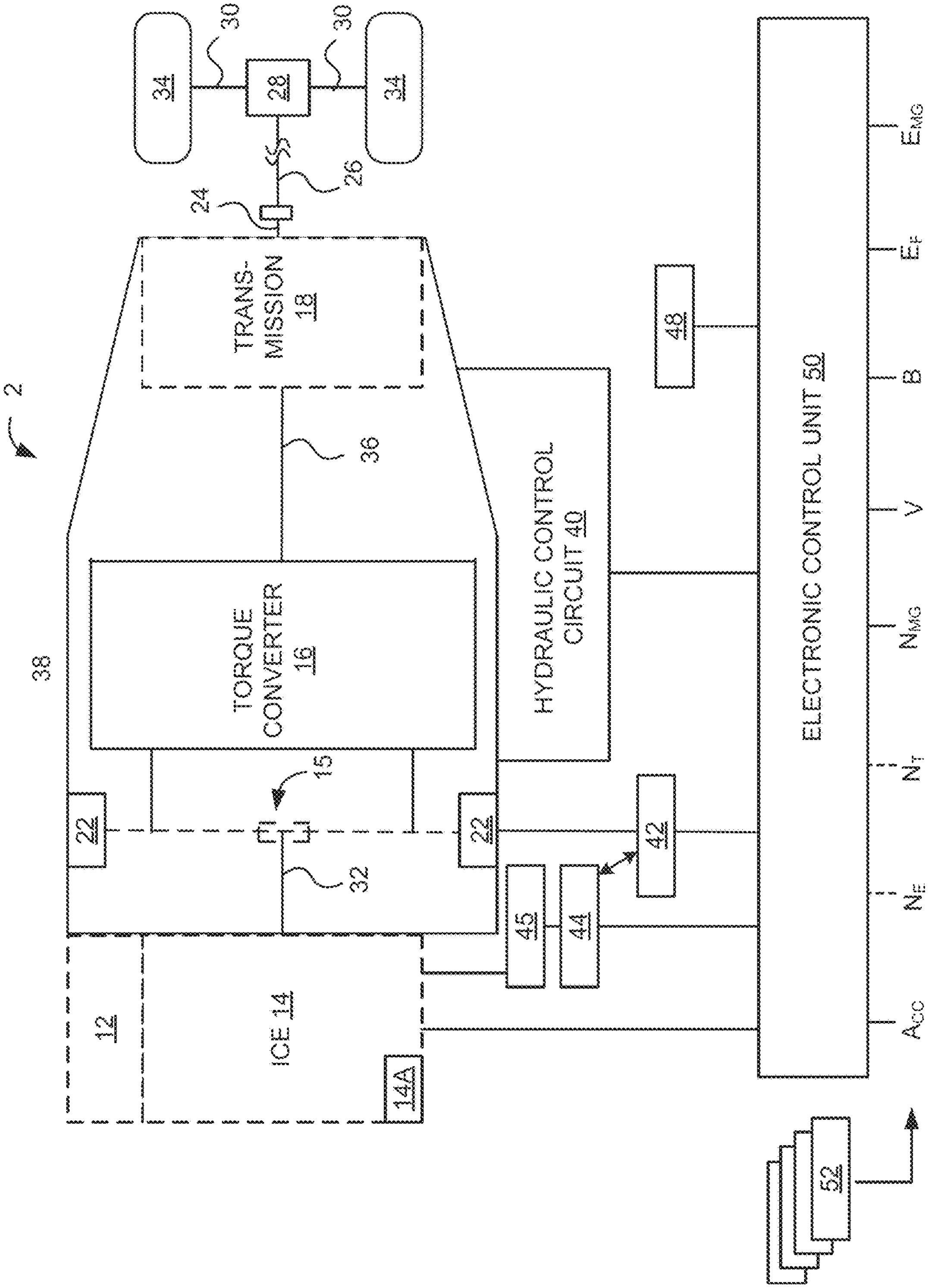
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for driver style detection and mitigation can be implemented in other types of vehicles including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
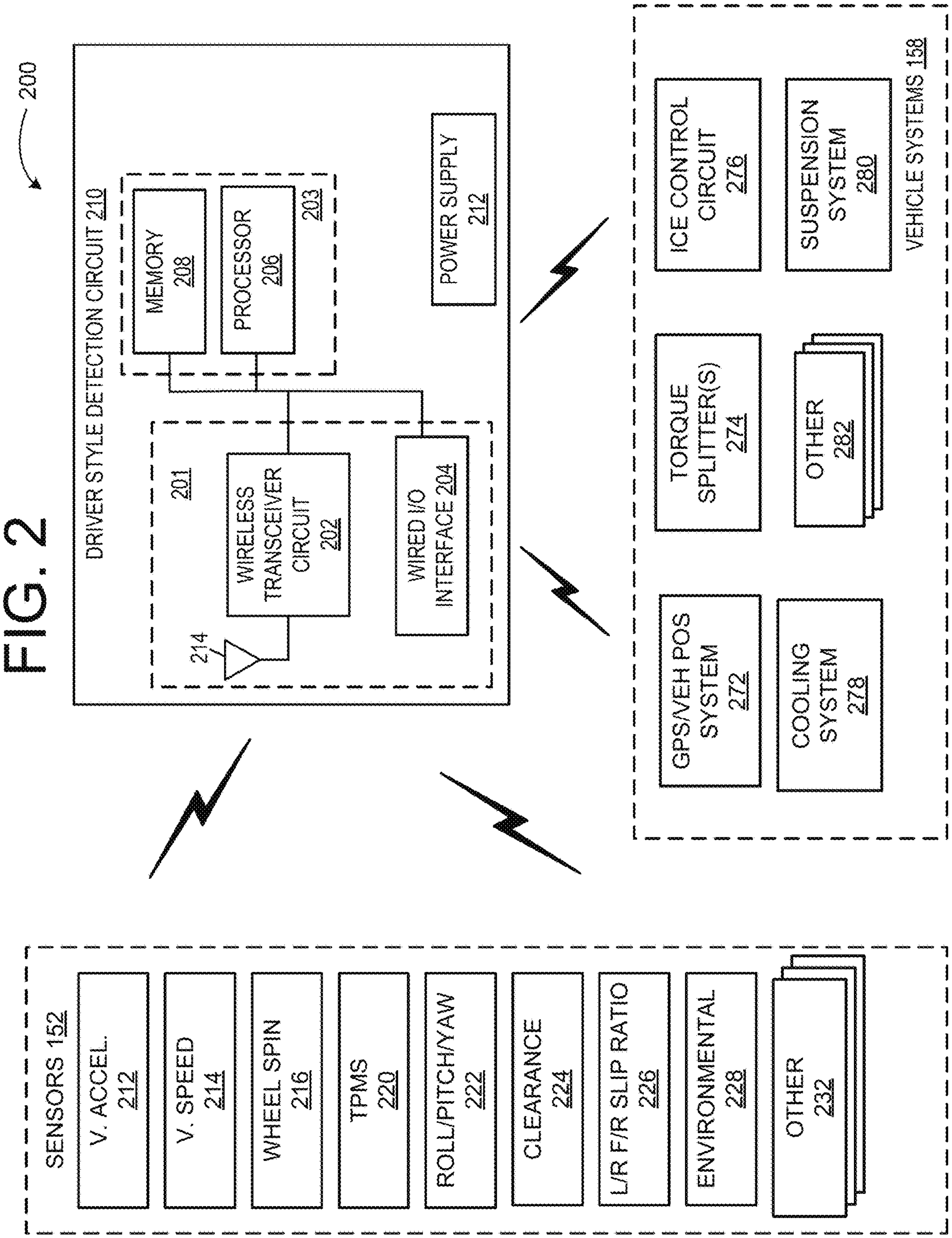
FIG. 2 illustrates an example of an all-wheel drive hybrid vehicle with which embodiments of the systems and methods disclosed herein may be implemented.

FIG. 2 illustrates an example architecture for incorporating driver styles in accordance with one embodiment of the systems and methods described herein. In some embodiments, driver style detection system 200 can be implemented in-vehicle to execute while a driver is operating the vehicle. In other embodiments, driver style detection system 200 can operate over a cloud or other network. Referring now to FIG. 2, in this example, driver style detection system 200 includes a driver style detection circuit 210, a plurality of sensors 152 and a plurality of vehicle systems 158.

Sensors 152 and vehicle systems 158 can communicate with driver style detection circuit 210 via a wired or wireless communication interface. Although sensors 152 and vehicle systems 158 are depicted as communicating with driver style detection circuit 210, they can also communicate with each other as well as with other vehicle systems. In embodiments where driver style detection circuit 210 is implemented in-vehicle, driver style detection circuit 210 can be implemented as an ECU or as part of an ECU such as, for example electronic control unit 50. In other embodiments, driver style detection circuit 210 can be implemented independently of the ECU, such that sensors 152 and vehicle systems 158 can communicate to driver style detection circuit 210 over a network, server or cloud interface. In embodiments where driver style detection circuit 210 operates over a network, driver style detection circuit 210 can execute the architecture described below in FIGS. 3A-C and communicate back to sensors 152 and vehicle systems 158.

Driver style detection circuit 210 in this example includes a communication circuit 201, a decision circuit 203 (including a processor 206 and memory 208 in this example) and a power supply 212. Components of driver style detection circuit 210 are illustrated as communicating with each other via a data bus, although other communication in interfaces can be included. Driver style detection circuit 210 can detect an unsafe driving condition for the vehicle. Decision circuit 203 can infer the characteristics of the unsafe driving situation and assess the indicators leading to the unsafe driving situation. As described further below, driver style detection circuit 210 can use these indicators to perform pattern recognition and predict a driver's actions in response to an unsafe driving condition. Driver style detection circuit 210 can generate alternative guidance in response to the predicted actions. Conversely, if the remote server generates the alternative guidance, driver style detection circuit 210 can communicate with vehicle systems 158 through communication circuit 201 to appropriately react to an unsafe driving condition.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to driver style detection circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a driver style detection circuit 210.

Communication circuit 201 can comprise either or both a wireless transceiver circuit 202 with an associated antenna 205 and a wired I/O interface 204 with an associated hardwired data port (not illustrated). Communication circuit 201 can provide for V2X and/or V2V communications capabilities, allowing driver style detection circuit 210 to communicate with edge devices, such as roadside unit/equipment (RSU/RSE), network cloud servers and cloud-based databases, and/or other vehicles via a network. For example, V2X communication capabilities allows driver style detection circuit 210 to communicate with edge/cloud devices, roadside infrastructure (e.g., such as roadside equipment/roadside unit, which may be a vehicle-to-infrastructure (V2I)-enabled streetlight or cameras, for example), etc. Local driver style detection circuit 210 may also communicate with other connected vehicles over vehicle-to-vehicle (V2V) communications.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As this example illustrates, communications with driver style detection circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by driver style detection circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which the driver style detection system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of driver style detection system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

Communication circuit 201 can be used to transmit and receive information between driver style detection circuit 210 and sensors 152, and driver style detection circuit 210 and vehicle systems 158. Also, sensors 152 may communicate with vehicle systems 158 directly or indirectly (e.g., via communication circuit 201 or otherwise).

Figure 3A:
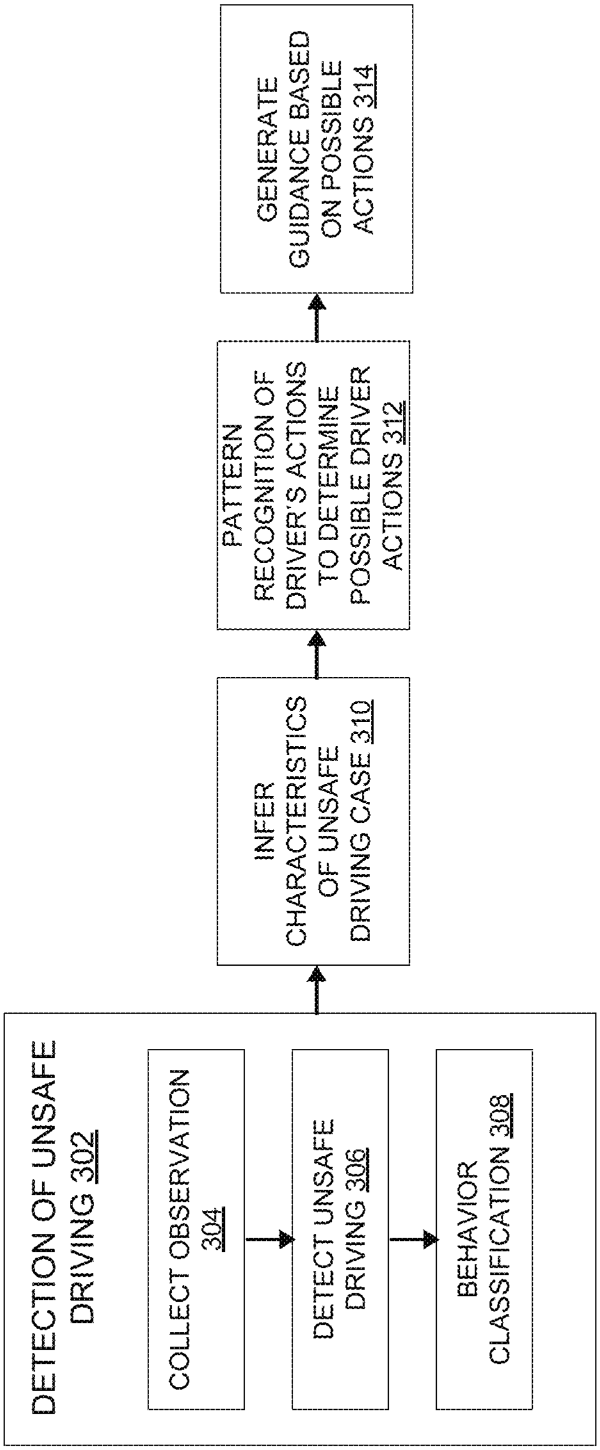
FIG. 3A illustrates an example architecture for incorporating the driver's actions in accordance with one embodiment of the systems and methods described herein.

FIG. 3A illustrates an example architecture for driver style detection and implementation. At block 302, either a vehicle, group of vehicles, and/or remote server can detect an unsafe driving condition. Vehicles can run any type of unsafe driving detection system to determine an unsafe condition, such as time-series analyses to measure the driving deviation over time. When the driving deviation reaches a certain threshold, the ego vehicle can tag the subject vehicle as unsafe. On the other hand, remote servers can run any anomaly detection with data from multiple vehicles. Anomaly detection can comprise observing multiple variables at the same time and performing time-series analyses to detect anomalies. The vehicle or remote server can collect observations 304 via sensor data, time series analysis, or any other observations about the environment, ego vehicle, or surrounding vehicles. The vehicle or remote server can detect unsafe driving 306 using any of the methods described above or any other unsafe driving detection system. The vehicle or remote server can classify the behavior 308 based on the type of unsafe driving, such as distracted driving, reckless driving, drunk driving, etc.

At block 310, the system can infer characteristics of the unsafe driving condition. Characteristics can be inferred from sensor data, infrastructure data, and/or any other data used to determine the unsafe driving condition. Characteristics can include but are not limited to the type of driver (e.g., aggressive, distracted, reckless), repetition of the unsafe driving, movement patterns (periodic or not), and/or the number of lanes affected. The system can run time series analyses to infer properties of movement patterns. For example, in a case of aggressive driving, the vehicle may be weaving from left to right in a cycle that repeats every three seconds. As another example, the remote server may retrieve the number of lanes affected by the unsafe driving condition based on data such as infrastructure data, traffic data, ego-vehicle data, data from other vehicles and GPS data.

At block 312, the system can perform pattern recognition of the driver's actions to determine the ego driver's possible actions. For example, the system can perform pattern recognition to understand the actions of an ego driver when affected by unsafe driving under different type of vehicles, type of location, type of occupants in the vehicle, and type of weather. For example, an ego driver may tend to change lanes in the presence of a subject vehicle weaving in an "S" shape. As another example, an ego driver may accelerate in response to a tailgating subject vehicle. These driver actions can be stored in an action database to be retrieved at any time. These actions can be associated with the type of vehicle, location of the vehicle, type of occupants in the vehicle, weather, unsafe driving condition, or any other parameter affecting the driver's choice of actions. The action database may store actions related to a single driver, or multiple related drivers.

A confidence level may be attributed to the driver actions as associated with a particular unsafe driving condition. The confidence level may relate to the consistency with which the driver takes particular actions. For example, a driver may sometimes change lanes in response to a tailgater but may always change lanes in response to a weaving driver. These parameters can characterize the ego driver's actions to determine if there is a likely conflict. If the system determines a new driver action is occurring in response to an unsafe driving condition, the new action can be added to the action database and can be associated with one or more unsafe driving conditions. As future unsafe driving conditions occur, the system can determine the unsafe driving condition and retrieve associated driver actions from the action database. This type of learning can be accomplished by an ego vehicle, multiple connected vehicles, or by a remote server. Any of these mechanisms can attribute driver actions to unsafe driving conditions in the action database. The action database can be updated accordingly as new information comes in at any level.

At block 314, the system can generate appropriate guidance based on the possible driver actions. The system can determine that there's a conflict between the default guidance and the potential driver's actions in response to the unsafe driver conditions (e.g., those actions stored based on the driver's past actions in similar circumstances). In cases where there are multiple potential driver actions, the system may update guidance in response to a conflict with any one of the potential driver actions. In some embodiments, the updated guidance may take into account one, multiple or all potential driver actions. The driver actions may be weighted, and the system may update guidance based on the confidence level associated with the driver actions. In response to determining the conflict, a control suggestion can be generated to minimize the risk of collision. At one level, this may mean not alerting the driver to the unsafe driving condition to prevent the conflicting action, or alerting the driver generally to the condition without providing a control suggestion. If a driver is notified and provided a control suggestion, a notification of the control suggestion can be presented to the driver in-vehicle, audibly, visually or both. The control suggestion can apply optimization-based strategies that utilize V2X communication to resolve conflicts between vehicles of different automation levels. For example, alerting a driver of an unsafe driving condition may increase the risk of a collision. Instead, the system can position (e.g., alert and guide) other vehicles so that the unsafe vehicle can quickly and safely weave between the vehicles and move away from the surrounding area. Other vehicle systems may operate in the background. For example, the ego vehicle may record video, notify authorities, and/or otherwise monitor the unsafe driver. These example operations may also occur at the remote server level or by surrounding vehicles with V2X connections.

Figure 3B:
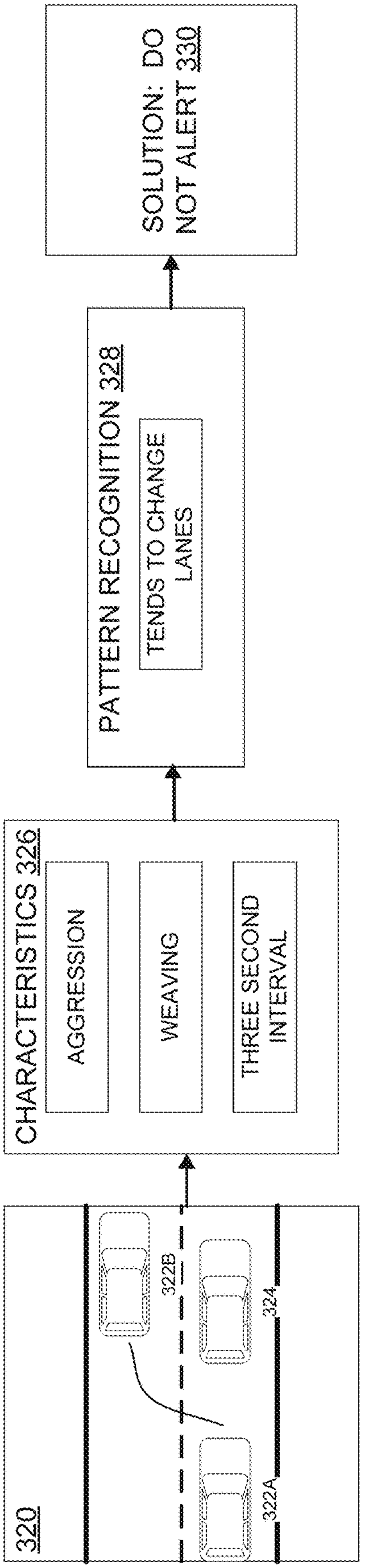
FIG. 3B illustrates a first example scenario incorporating the embodiments described herein.

FIG. 3B illustrates an example scenario incorporating the architecture of FIG. 3A. Block 320 illustrates the example unsafe driving condition. Here, an unsafe vehicle abruptly change lanes from position 322A to 322B. Ego vehicle 324 can detect this unsafe lane change. At block 326, the system can infer the characteristics of the unsafe driving condition. Here, the unsafe driving may be aggressive and characterized by an abrupt lane change that repeats every three seconds. At block 328, the system can perform pattern recognition and retrieve the actions of the ego driver when affected by this type of driving behavior. In the example of FIG. 3B, the system can determine that the ego driver may tend to change lanes in this condition to put more distance between him or herself and the unsafe vehicle. This action may be associated with the subject vehicle type, the location, the weather, the type of unsafe driving condition, or any one or more other parameters in the action database to characterize the stored driver actions.

The system can determine a conflict, such as for example where the ego driver may risk a collision if he/she changes lanes into other traffic.

At block 330, the system can determine, depending on the circumstances, that the best solution is to not alert the ego driver. As described above, the system can derive one or more possible alternatives to reduce or mitigate the unsafe driving condition. For example, the system can position other vehicles according to the movement patterns of the unsafe driver. As another example, the system can decide that it is prudent to allow the ego driver to take action on his or her own, with or without a general warning. As another alternative, the ego vehicle may begin recording video on all sides to continue to monitor the weaving patterns of the unsafe vehicle. If the weaving patterns change, the system may change the solution based on the driver's actions associated with the different type of weaving.

Figure 3C:
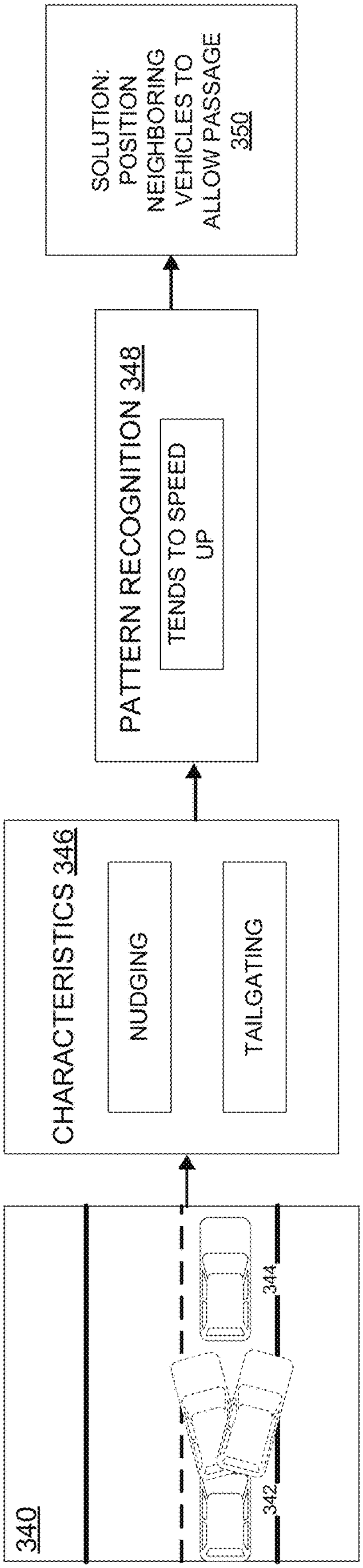
FIG. 3C illustrates a second example scenario incorporating the embodiments described herein.

FIG. 3C illustrates another example scenario incorporating the architecture of FIG. 3A. Block 340 illustrates the example unsafe driving condition. Here, an unsafe vehicle 342 may be tailgating and nudging ego vehicle 344. The ego vehicle may detect this unsafe vehicle based on its proximity/motion sensors, rear camera, and/or speed sensors. The system can determine an unsafe driving condition based on unsafe vehicle 342's movements. At block 346, the system can infer the characteristics of the unsafe driving condition. Here, the unsafe driving may be characterized by nudging behavior and tailgating at high speed. At block 348, the system can perform pattern recognition and retrieve the actions of the ego driver when affected by this type of driving behavior. In the example of FIG. 3C, the system can determine that the ego driver may tend to accelerate to add distance between the ego vehicle and the unsafe vehicle. This action may be associated with the subject vehicle type, the location, the weather, the type of unsafe driving condition, or any other parameters in the action database to characterize the stored driver actions. The system can determine a conflict because accelerating may worsen the tailgating, cause a speed limit violation or result in additional unsafe behavior from the ego vehicle or the unsafe vehicle.

At block 350, the system can determine that the best solution is to 1) not alert the ego driver and 2) position other vehicles to provide the unsafe vehicle with space in a different lane. The unsafe vehicle may take the opportunity to change lanes and stop tailgating the ego vehicle. As an alternative, the system might determine that the best solution is to alert the ego driver and provide guidance that is different from, and safer than, his or her typical or predictive reaction. For example, rather than telling the ego driver to accelerate like he or she might normally do, the system might determine that it is safe to change lanes and alert the ego driver to change lanes to allow the tailgating vehicle to pass.

Figure 4:
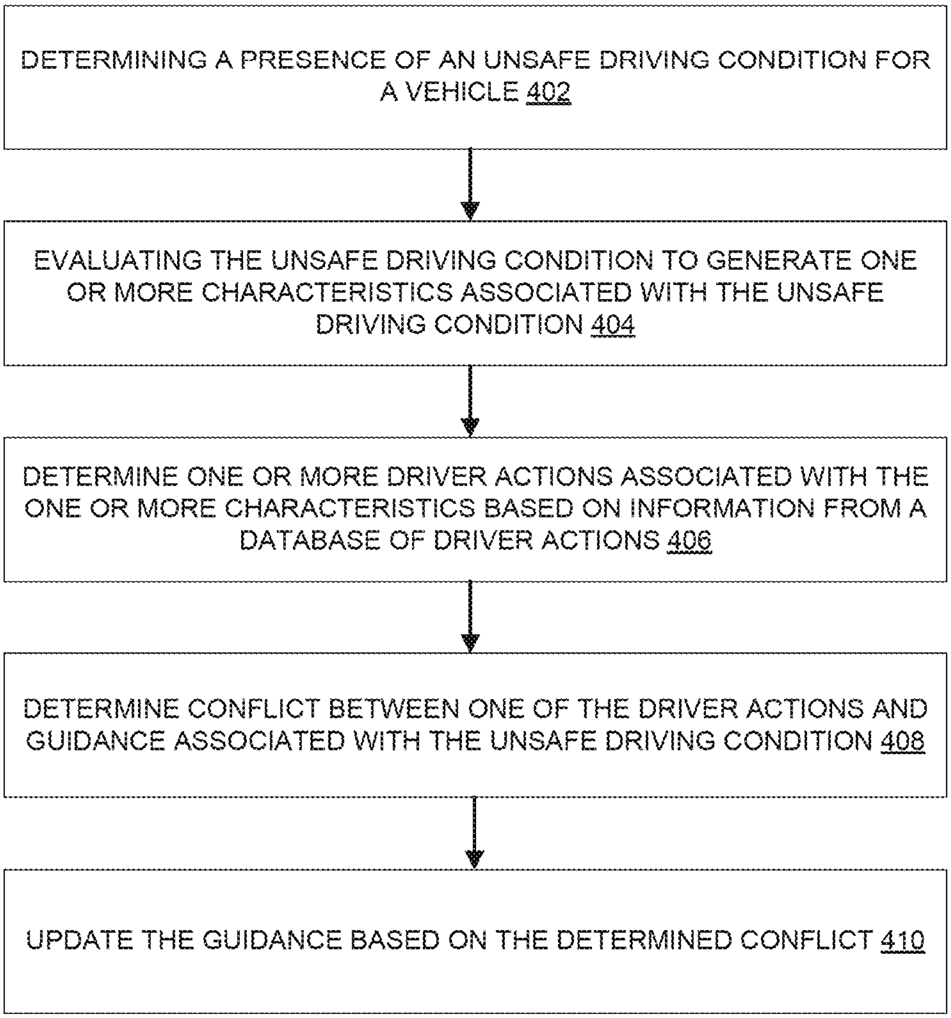
FIG. 4 illustrates an example method in accordance with the embodiments described herein.

FIG. 4 illustrates an example method incorporating the systems described above. At block 402, the system can determine a presence of an unsafe driving condition for a vehicle. As described above, remote servers can run any anomaly detection with data from multiple vehicles. Anomaly detection can comprise observing multiple variables at the same time and performing time-series analyses to detect anomalies. The remote server can classify the behavior based on the type of unsafe driving, such as distracted driving, reckless driving, drunk driving, etc.

At block 404, the system can evaluate the unsafe driving condition to generate one or more characteristics associated with the unsafe driving condition. As described above, characteristics can be inferred from sensor data, infrastructure data, and/or any other data used to determine the unsafe driving condition. Characteristics can include but are not limited to the type of driver (e.g., aggressive, distracted, reckless), repetition of the unsafe driving, movement patterns (periodic or not), and/or the number of lanes affected. The system can run time series analyses to infer properties of movement patterns.

At block 406, the system can determine one or more driver actions associated with the one or more characteristics based on information from a database of driver actions. As described above, the system can perform pattern recognition to understand the actions of an ego driver when affected by unsafe driving under different conditions such as the type of vehicle, type of location, type of occupants inside the vehicle, and type of weather. The action database may store actions related to a single driver, or multiple related drivers. A confidence level may be attributed to the driver actions as associated with a particular unsafe driving condition, and the listed driver actions can be weighted accordingly. If the system determines a new driver action is occurring in response to an unsafe driving condition, the new action can be added to the action database and be associated with one or more unsafe driving conditions. The new action may also be weighted. As future unsafe driving conditions occur, the system can determine the unsafe driving condition and retrieve associated driver actions from the action database. The action database can be updated accordingly as new information comes in at any level (e.g. at the vehicle or remote server level). Other actions may be considered when determining the weighting of driver actions instead of or in addition to the propensity for a driver to undertake a certain action. For example, the safety of a particular maneuver can be considered when determining weighting for various driver actions.

At block 408, the system can determine a conflict between one of the driver's actions and guidance associated with the unsafe driving condition. In response, a control suggestion can be generated to minimize the risk of collision. At one level, this may mean not alerting the driver to the unsafe driving condition to prevent the conflicting action. The control suggestion can apply optimization-based strategies that utilize V2X communication to resolve conflicts between vehicles of different automation levels. Other vehicle systems may operate in the background. For example, the ego vehicle may record video, notify authorities, and/or otherwise monitor the unsafe driver. These example operations may also occur at the remote server level or by surrounding vehicles with V2X connections.

At block 410, the system can update the guidance based on the determined conflict. In some embodiments, the system can determine that the best solution is to not alert the ego driver. As described above, the system can derive one or more possible alternatives to reduce or mitigate the unsafe driving condition. Other background systems may be initiated instead of alerting the ego driver. Example background systems can include video monitoring, movement of connected vehicles, and/or any other applicable systems that can monitor or mitigate the unsafe driving condition. The system can continuously update this guidance as new driver actions are added to the action database or as the unsafe driving condition changes. The guidance can be generated at the vehicle level or at the remote server level. If the guidance is generated at the remote server level, the remote server can communicate the guidance to the vehicle systems.

Figure 5:
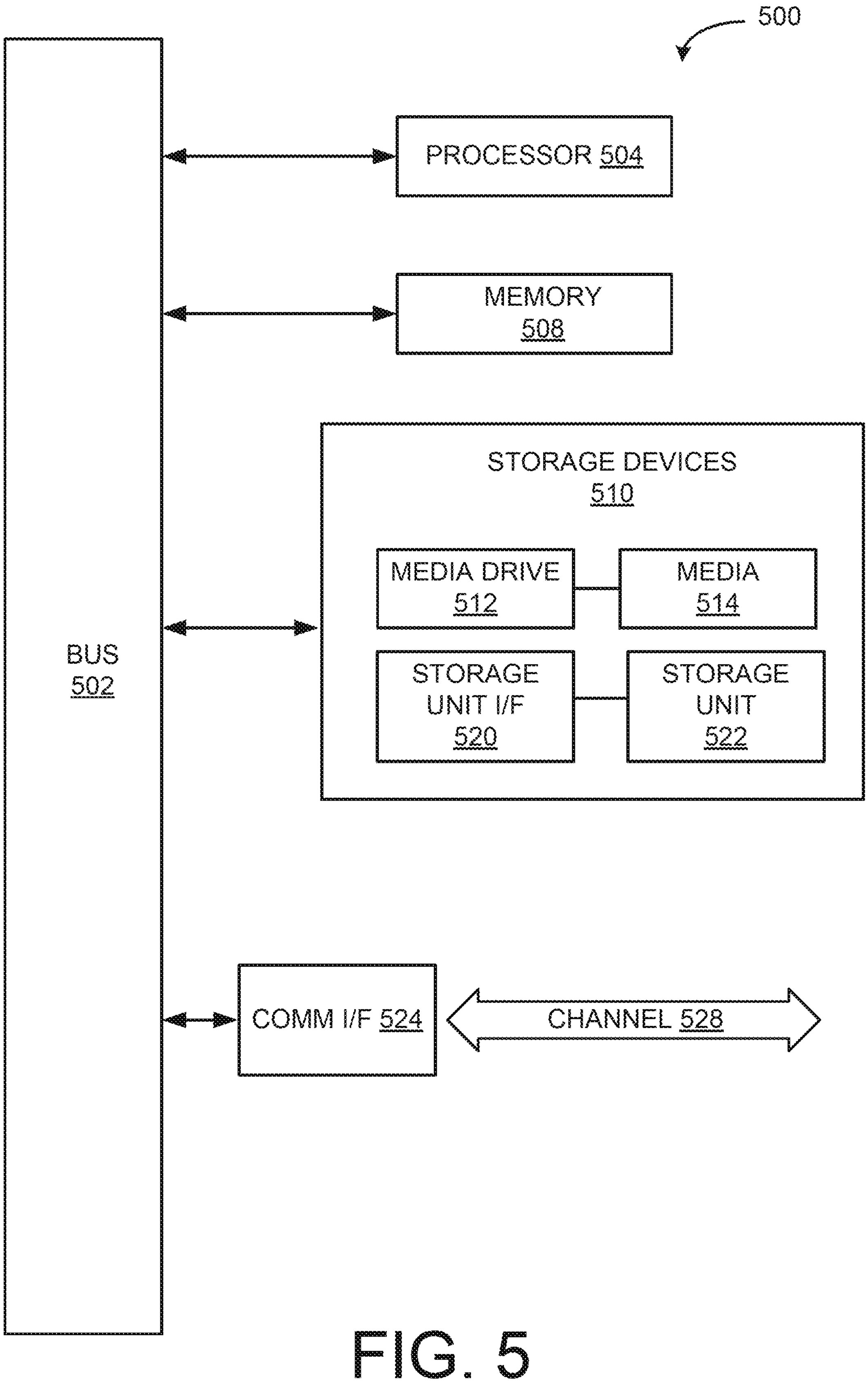
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

determining a presence of an unsafe driving condition for a vehicle;

evaluating the unsafe driving condition to generate one or more characteristics associated with the unsafe driving condition;

determining one or more driver actions associated with the one or more characteristics based on information from a database of driver actions;

determining a conflict between one of the driver actions and guidance associated with the unsafe driving condition;

updating the guidance based on the determined conflict; and automatically initiating one or more background vehicle systems based on the updated guidance.

2. The method of claim 1, wherein updating the guidance comprises instructing the vehicle not to notify the driver of the vehicle of the unsafe driving condition.

3. The method of claim 1, further comprising instructing one or more neighboring vehicles to mitigate the unsafe driving condition.

4. The method of claim 1, further comprising receiving data indicating a new driver action and adding the new driver action to the database of driver actions.

5. The method of claim 1, wherein determining the conflict comprises determining multiple conflicts between the one or more driver actions and the guidance and updating the guidance to account for the multiple conflicts.

6. The method of claim 1, wherein determining the conflict comprises performing pattern recognition of the one or more driver actions and the unsafe driving condition.

7. The method of claim 1, further comprising associating the one or more driver actions with the unsafe driving condition in the database of driver actions.

8. The method of claim 1, further comprising generating a notification to display to the driver of the vehicle with the updated guidance.

9. The method of claim 1, further comprising warning the driver of the vehicle of a nearby unsafe vehicle based on the determined one or more driver actions.

10. A vehicle, comprising:
a plurality of sensors;
one or more processors; and
a memory coupled to the one or more processors to store instructions, which when executed by the one or more processors, cause the one or more processors to:
determine a presence of an unsafe driving condition for a vehicle;
evaluate the unsafe driving condition to generate one or more characteristics associated with the unsafe driving condition;
determine one or more driver actions associated with the one or more characteristics based on information from a database of driver actions;
determine a conflict between one of the driver actions and guidance associated with the unsafe driving condition;
refrain from notifying the driver of the vehicle about the unsafe driving condition based on the conflict; and
automatically initiate one or more background vehicle systems based on the unsafe driving condition.

11. The vehicle of claim 10, wherein the one or more processors are further configured to instruct one or more neighboring vehicles to mitigate the unsafe driving condition.

12. The vehicle of claim 10, wherein the one or more processors are further configured to receive data indicating a new driver action and add the new driver action to the database of driver actions.

13. The vehicle of claim 10, wherein determining the conflict comprises performing pattern recognition of the one or more driver actions and the unsafe driving condition.

14. The vehicle of claim 10, wherein the one or more processors are further configured to associate the one or more driver actions with the unsafe driving condition in the database of driver actions.

15. A non-transitory machine-readable medium having instructions stored therein, which when executed by one or more processors, cause the one or more processors to:
determine a presence of an unsafe driving condition for a vehicle;
evaluate the unsafe driving condition to generate one or more characteristics associated with the unsafe driving condition;
determine one or more driver actions associated with the one or more characteristics based on information from a database of driver actions;
determine a conflict between one of the driver actions and guidance associated with the unsafe driving condition;
instruct one or more neighboring vehicles to mitigate the unsafe driving condition; and
automatically initiating one or more background vehicle systems for the vehicle based on instructions provided to the one or more neighboring vehicles.

16. The non-transitory machine-readable medium of claim 15, wherein the one or more processors are further configured to update the guidance based on the conflict.

17. The non-transitory machine-readable medium of claim 16, wherein the one or more processors are further configured to generate a notification to display to the driver of the vehicle with the updated guidance.

18. The non-transitory machine-readable medium of claim 15, wherein the one or more processors are further configured to receive data indicating a new driver action and adding the new driver action to the database of driver actions.

19. The non-transitory machine-readable medium of claim 15, wherein determining the conflict comprises determining multiple conflicts between the one or more driver actions and the guidance and updating the guidance to account for the multiple conflicts.

20. The non-transitory machine-readable medium of claim 15, wherein determining the conflict comprises performing pattern recognition of the one or more driver actions and the unsafe driving condition.

* * * * *